United States Patent

Takagi et al.

[11] Patent Number: 5,910,935
[45] Date of Patent: *Jun. 8, 1999

[54] VIBRATION-RESISTANT PLAYBACK DEVICE HAVING IMPROVED SYNCHRONIZATION

[75] Inventors: Hirohito Takagi, Villingen-Schwenningen; Richard Rutschmann, Wutöschingen, both of Germany

[73] Assignee: Deutsche Thomson Brandt GmbH, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/567,997

[22] Filed: Dec. 6, 1995

[30] Foreign Application Priority Data

Dec. 16, 1994 [DE] Germany .................. 44 45 013

[51] Int. Cl.⁶ .................................................. G11B 7/00
[52] U.S. Cl. .......................... 369/54; 369/48; 369/60
[58] Field of Search ............................ 369/47, 48, 54, 369/60, 32, 59

[56] References Cited

U.S. PATENT DOCUMENTS 5,212,678  5/1993  Roth et al. .................. 369/60
5,224,089  6/1993  Matsumura et al. .......... 369/124
5,289,440  2/1994  Bakx ............................ 369/32
5,365,502  11/1994  Misono ........................ 369/32

FOREIGN PATENT DOCUMENTS

0136882  4/1985  European Pat. Off. .
3733167  4/1988  Germany .

Primary Examiner—Thang V. Tran
Attorney, Agent, or Firm—Joseph S. Tripoli; Frederick A. Wein

[57] ABSTRACT

A control unit, stores addresses of a write pointer of a buffer in the case of the last valid subcode information and starts with a synchronization byte following an interruption. The synchronization byte is provided for the synchronization of the data stream in the buffer, an item of address information which identifies the interruption location in the data stream, the starting point of the synchronization being formed by a valid subcode, the address information being used as a reference both for the location of the interruption on the information medium and for the last valid data in the buffer and the writing in the buffer. This is done so that uninterrupted reproduction of information is provided despite vibrations in the playback device.

12 Claims, 4 Drawing Sheets

VIBRATION-RESISTANT PLAYBACK DEVICE HAVING IMPROVED SYNCHRONIZATION

The invention relates to a method and an arrangement for a vibration-resistant playback device having improved synchronization

BACKGROUND

The field of application of vibration-resistant playback devices applies, in particular, to the portable and mobile use of playback devices of optical information media, in which uninterrupted and undisturbed reproduction of information must be ensured despite vibrations, the field of application not being restricted, however, to optical information media.

Optical scanning devices, in particular, are sensitive to mechanical vibrations, since the optical scanning system can be pitched from the track by vibrations and, as a result, the read operation of the information stored on the information medium is interrupted. During stationary operation, these vibrations are so small that they can be adequately damped by means of mechanical precautions and electrical control loops. However, in the case of mobile use, such as, for example, in a car, or in the case of portable devices, the abovementioned measures no longer suffice, and use is made of a buffer which buffers the data stream for the purpose of reproduction during an interruption of the reading of the information medium. A buffer of this type is known in accordance with the data sheet of the CXD2511Q/R circuit from Sony (Vibration-Protective Memory Controller for CD Players). In order to provide a data reserve, the data are read from the CD at twice the speed and are stored in the buffer. At the same time, data are read at normal speed from the buffer for the purpose of reproduction. In order to prevent an overflow of the buffer, the reading of the information medium or the writing of data to the buffer must be continuously interrupted and the read operation must be resumed after the occupancy of the buffer has fallen below a minimum occupancy. For this purpose, the scanning or reading system must be returned to the location of the interruption and the reading of the information medium must be continuously resumed. This sequential pattern of events is continued unremittingly provided that no vibration occurs. As a result, a high number of resets or returns of the scanning or reading system are already necessary during vibration-free operation.

If a vibration occurs during a reading pause, no special measures are necessary.

However, if the vibration occurs during the read operation, then the filling of the buffer must be stopped immediately and the scanning system must be returned as quickly as possible to the location at which the read operation was interrupted, in order to read anew data from the information medium or the CD. Following successful conclusion of this operation, the filling of the buffer is resumed. Consequently, this jumping or resetting of the scanning system to the location of the interruption of the reading of the CD is not only necessary when vibrations occur but also necessary when vibrations do not occur in the vibration resistance mode of operation, since the read operation which is carried out at twice the speed must be interrupted when the buffer is full.

In order to write data from the information medium to the buffer following an interruption in accordance with the order present on the information medium, the reading of the CD is resumed using data prior to the last subcode address evaluated as valid by a microprocessor, and in order to start the writing to the buffer, or for the sequentially correct resumption, a comparison between the stored and the read audio data is carried out. This audio data comparison, which controls the resumption of the writing to the buffer in the event of a positive result, is carried out after the decoding and error correction and directly before the digital/analog conversion. The buffer is connected to the de-interleaving and error correction unit of the decoder and is arranged directly before the digital/analog converter. (Interleaving= [in German] Verschachtelung, Überlappung [overlapping], Codespreizung [code spreading]).

In addition to the relatively high number of returns when no vibrations occur, a problem of this solution is the reliability of the data synchronization for starting the write operation to the buffer. In the case of the known solution, the purpose of synchronization following an interruption of the writing to the buffer is served by using a predetermined volume of data to find, by comparison, the identical location of the data which have already been stored in the buffer. The synchronization which is based on the audio data comparison is not always successful, since, owing to errors, the data bits do not always appear in the same way and accurately timed. On account of the error rate, it is not always possible to derive the same data from the identical location on the information medium. A chronological offset also occurs when comparing very soft passages, in which only zeros are compared, or when comparing passages which contain multiple repetitions such as, for example, a sinusoidal tone at a specific frequency.

The data comparison which must be carried out frequently in connection with the interruptions does not guarantee the determination of the exact synchronization instant, leads to jumps in the audio data and consequently, owing to chronological jumps in the title or disk time, does not ensure accurately timed reproduction corresponding to the stored information.

Therefore, a comparison with stepped accuracy or a comparison in a plurality of stages is already carried out in the known solution in order, if possible, to bring about correspondence. The accuracy and the length of the comparison are varied in order to permit tolerances during the comparison. This results in jumps in the audio data and, consequently, does not ensure accurately timed reproduction corresponding to the stored information. The more or less exact synchronization takes place in the buffer arranged directly upstream of the digital/analog converter, with the result that erroneous synchronization causes audible interference.

Moreover, a DRAM must be provided as the buffer for the most exact data comparison possible, which DRAM represents a considerable cost factor.

SUMMARY

Therefore, the object of the invention is, in particular, to improve the reliability and accuracy of the synchronization and to avoid the said disadvantages of the known solution.

This object is achieved by means of the features specified in the main claims. Advantageous refinements and developments are specified in subclaims.

Although subcode data in the data stream occur only with relatively large spacings, reliable and exact synchronization and a seamless data flow corresponding to the information stored on the information medium are achieved in the buffer following an interruption as a result of the fact that use is made of an item of address information in the data stream which identifies the location of the interruption. The starting point of the synchronization is formed by a valid subcode, the address information of which is used as a reference both for the location of the interruption on the information medium and for the last valid data in the buffer and the writing to the buffer. Using the address which identifies the location of an interruption on the information medium and in the buffer, the synchronization and the writing to the buffer after an interruption can also be implemented even before the address of the interruption, since the spacing between the address read anew and the stored address of the interruption can be calculated. The data following the address are then overwritten, resulting in a shorter time to synchronization. For this purpose, the buffer is arranged upstream of the error correction and de-interleaving unit.

A data comparison is not carried out and an exact data flow is, nevertheless, reliably achieved, even with a varying reading speed within the capture range of the bit timing PLL, particularly as a result of the fact that the buffer simultaneously serves as a time base compensation unit and data are read at a constant speed from the buffer.

As a result of using synchronization bits of the subcode information, the address of which is fundamentally stored, in contrast with the known solution the writing of read data to the buffer must also not be interrupted during a vibration, a track jump or changes in the reading speed. The address of the last valid synchronization byte, which address is known when irregularities occur, ensures exact synchronization, since the address or the write pointer of the buffer is used for the synchronization or for the exact data flow in accordance with the information stored on the information medium. The synchronization location does not necessarily have to be the last valid synchronization byte or the last valid address, since, starting at the last valid address, the frame structure of digital data streams permits the calculation of addresses in the buffer prior to the occurrence of the irregularity. Starting at the selected synchronization location, all of the following data already stored in the buffer are overwritten. Only a low outlay is required despite the high accuracy and reliability which is achieved with this synchronization, since the corresponding control unit can essentially be realized using two counters and one register.

On account of the arrangement of the buffer between the EFM demodulator and the de-interleaving and error correction unit which provides the digital reproduction information, it is possible to use as buffer an ARAM, which is less expensive than a DRAM. The use of an ARAM or audio RAM, which may be partially defective, is made possible by the arrangement before the error correction.

It has already been mentioned that exact synchronization is ensured even in the event of the reading speed fluctuating within the capture range of the bit timing PLL. This aspect is significant in connection with an altered sequence for providing a data reserve in the buffer for bridging interruptions, said aspect being that the reading speed is increased beyond the normal speed without special vibration protection only for the purpose of filling the buffer. In this case, it is provided to increase or decrease the reading speed as a function of a predetermined occupancy of the buffer, in order to avoid frequent resetting of the scanning device caused by writing to the buffer at twice the speed and in order to avoid interruptions of the writing to the buffer which are not necessary on account of vibrations or of a so-called shock. As a result, both the power consumption and the number of necessary synchronization operations are reduced.

A further aspect is the rapid availability of data for reproduction, which rapid availability is already provided when the normal speed is reached.

Although the above explanations were essentially referring to a CD as the information medium, the field of application is not restricted thereby, since in principle all digital latches and information media, including, for example, the digital videodisk or digital tapes, have a comparatively similar data structure, which enables the principle upon which the invention is based to be applied.

BRIEF DESCRIPTION OF THE DRAWINGS

The invention is explained in more detail below with reference to drawings, in which.

DESCRIPTION OF THE PREFERRED EMBODIMENT(S)

Corresponding reference symbols are used consistently in the drawings.

Figure 3:
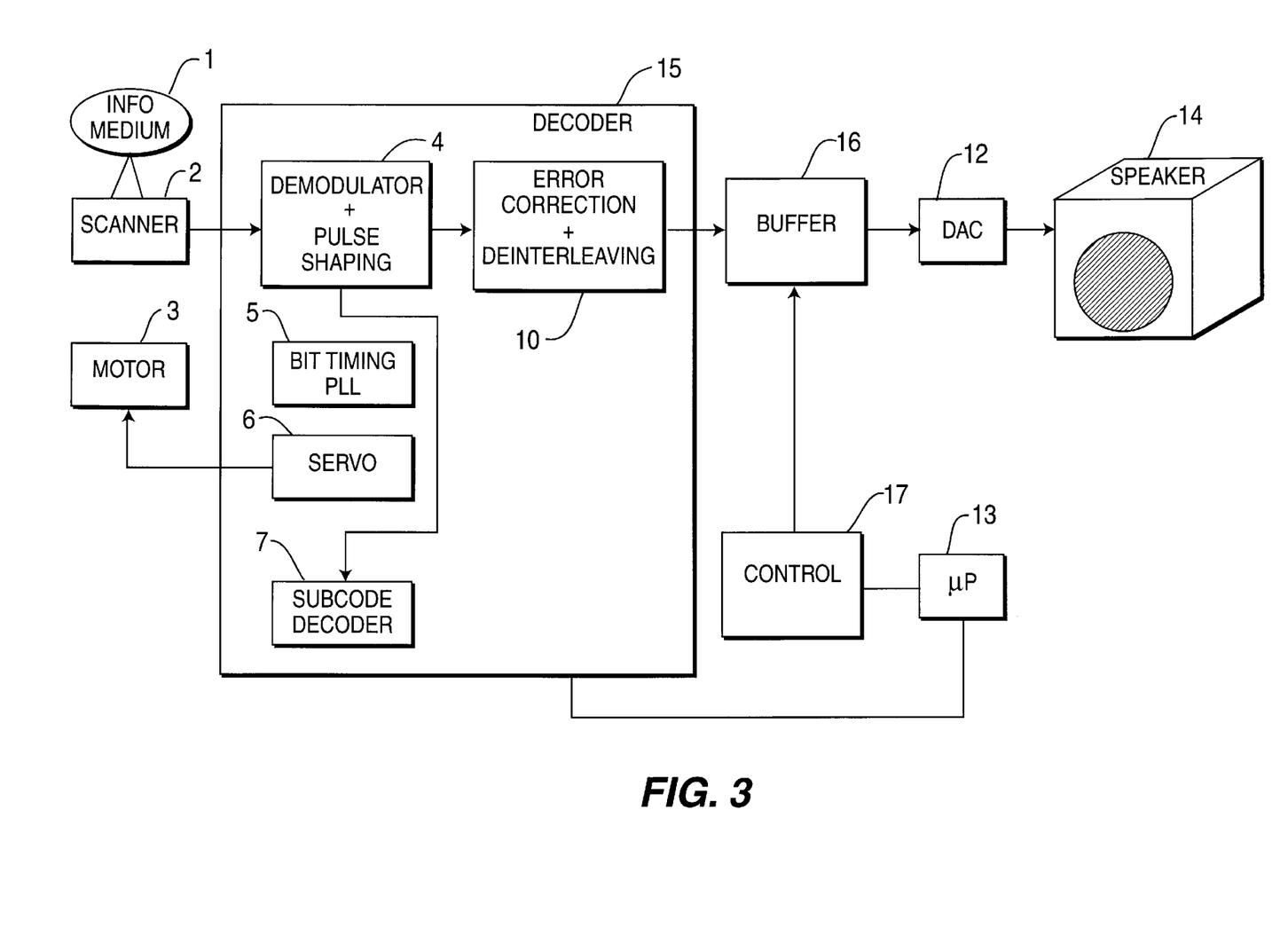
FIG. 3 shows a block diagram of a known vibration-resistant playback device.

In order to bridge interruptions of the read operation from the information medium 1, the known vibration-resistant playback device in accordance with FIG. 3 has a buffer 16, which is connected to a decoder 15 containing an error correction and de-interleaving unit 10. The buffer 16 is arranged directly upstream of the digital/analog converter 12, which is connected to a reproduction device 14, and is connected to a control unit 17 which is connected to the microprocessor 13 of the vibration-resistant playback device. In order to ensure disturbance-free and uninterrupted reproduction of information even during an interruption of the read operation from the information medium 1 due to vibrations, data read from the information medium 1 are written at twice the speed to the buffer 16 and are read out at normal speed. The result of this is that there is always an adequate volume of data in the buffer 16 in order briefly to bridge interruptions of the read operation from the information medium 1, and the buffer 16 is filled with data once more, following an interruption of the read operation which empties the buffer 16, in order to be prepared for another interruption. The information medium 1 is driven, for the purpose of reading at twice the speed, by a motor 3 which is operated at twice the rotational speed and is connected to a CLV servo 6. The CLV servo 6 is used to vary the rotational speed of the motor 3, which is in principle doubled in the case of the known playback device, as a function of the scanning radius in order to achieve an approximately constant reading speed. This varying of the rotational speed takes place in the scope which is conventional for a constant reading speed. The information stored on the information medium 1 is detected by a pick-up forming the scanning device 2 and is fed to a pulse-shaping and EFM demodulator unit 4. Using the pulse-shaping and EFM demodulator unit 4, in particular the digital signal which arrives from the information medium 1 and is still rounded is converted into a fairly digital signal and the timing required for the further processing of the information is generated. In this case, the EFM (eight to fourteen modulation) is provided, in particular, to permit reliable timing recovery even in the case of soft passages or pauses, in which the individual bits do not toggle between their possible states. A so-called bit timing PLL 5 is used, in particular, for this purpose. Furthermore, there are provided in the decoder 15 a subcode decoder 7, which decrypts the supplementary information contained in the subcode, and also an error correction and de-interleaving unit 10, by means of which the digital audio signal is provided in the case of a CD player. In the case of the known vibration-resistant playback device in accordance with FIG. 3, a buffer 16 designed as a DRAM is connected downstream of this error correction and de-interleaving unit 10. The audio data stored in the buffer 16 for bridging an interruption of the reading of information from the information medium 1 are then fed via a digital/analog converter 12 to the reproduction device 14. A control unit 17, which is also referred to as a shock-proof memory controller and is connected to a microprocessor 13 which organizes the control and data evaluation of the playback device, is provided for the organization of the buffer 16 or for writing data to and reading data from the buffer 16. With the known method, audio data are written to the buffer 16 until there is an interruption of the reading of information from the information medium 1 owing to a vibration or when the maximum occupancy of the buffer 16 has been reached. After an interruption, the scanning device 2 is then reset to a scanning location corresponding to the last valid subcode address, and the reading of the information medium 1 is resumed. However, since the scanned values are not present with any accuracy in the buffer 16 after the error correction and the de-interleaving and since there is no information which identifies the address of the interruption, a comparison must be carried out, until correspondence, between audio data read anew and audio data present in the buffer 16. The synchronization following an interruption of the writing to the buffer is served by using a predetermined volume of data or data length to find, by comparison in the buffer, the location of the data which have already been stored in the buffer. The synchronization which is based on the audio data comparison is not always successful, since, owing to errors, the data bits do not always appear in the same way and accurately timed. On account of the error rate, it is not always possible to derive the same data from the identical location on the information medium. For this reason, a comparison with stepped accuracy or a comparison in a plurality of stages is carried out in order, if possible, to bring about correspondence. For this purpose, the accuracy and the length of the comparison are varied in order to permit tolerances during the comparison. When more or less accurate correspondence is established, the writing of read data to the buffer 16 is then resumed. However, in the case of very soft information sections, muting on account of a very high error rate, or in the case of repetitions having the same information content, such a comparison results in correspondence at different locations, which correspondence does not correspond to the sequence of information stored on the information medium 1.

Figure 1:
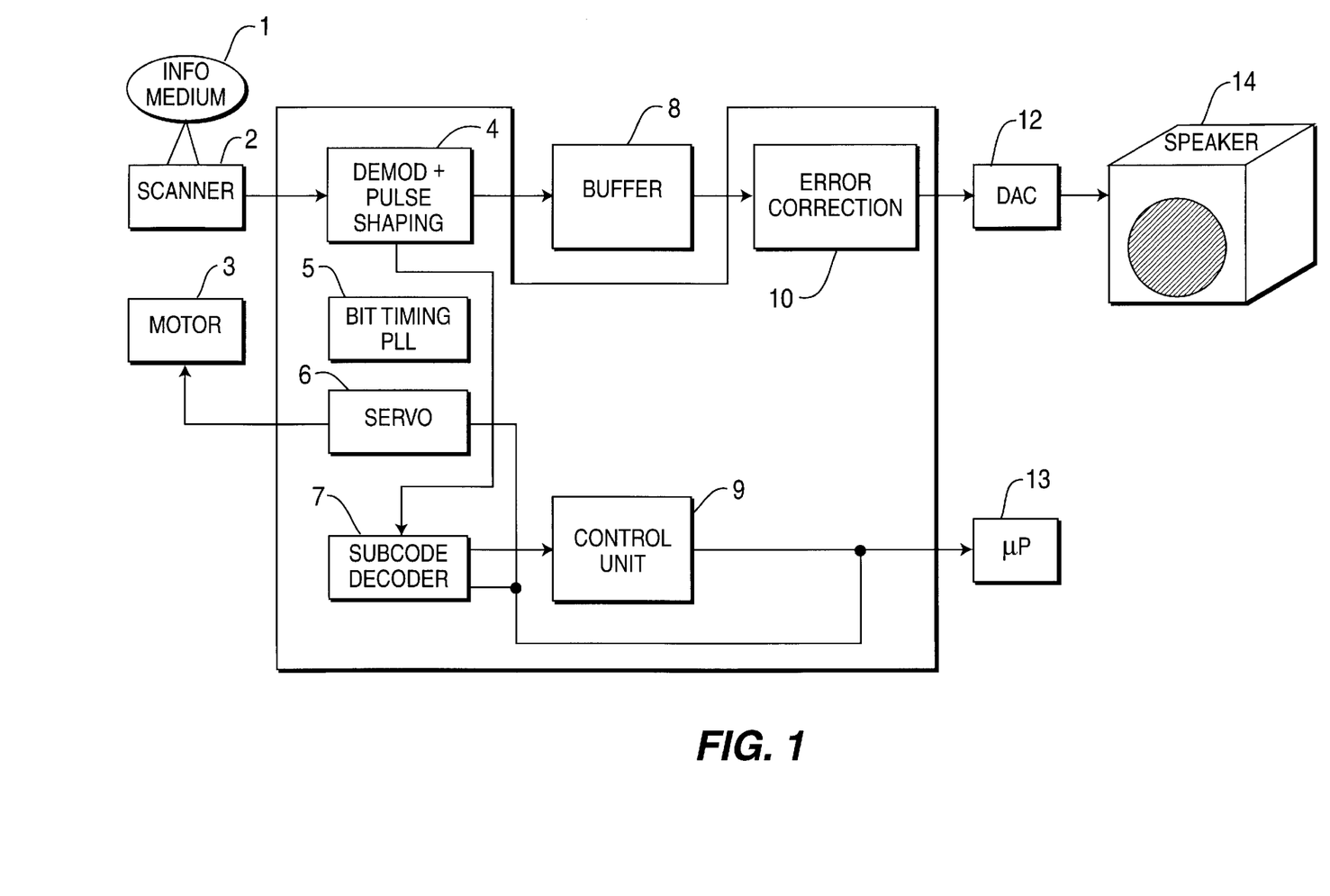
FIG. 1 shows a block diagram of the vibration-resistant playback device having improved synchronization.
Figure 2:
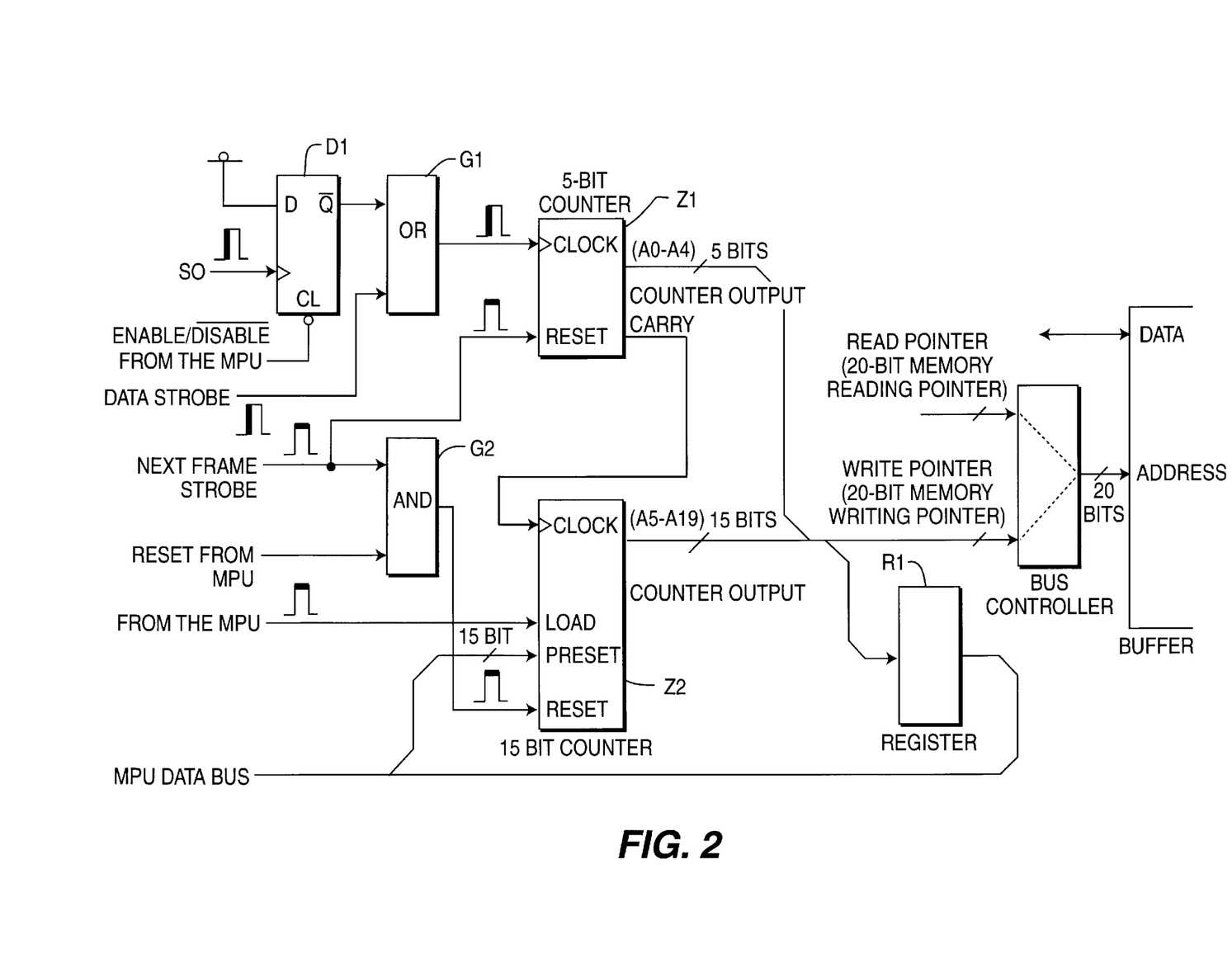
FIG. 2 shows a block diagram of that assembly of the vibration-resistant playback device which controls the synchronization.
Figure 4:
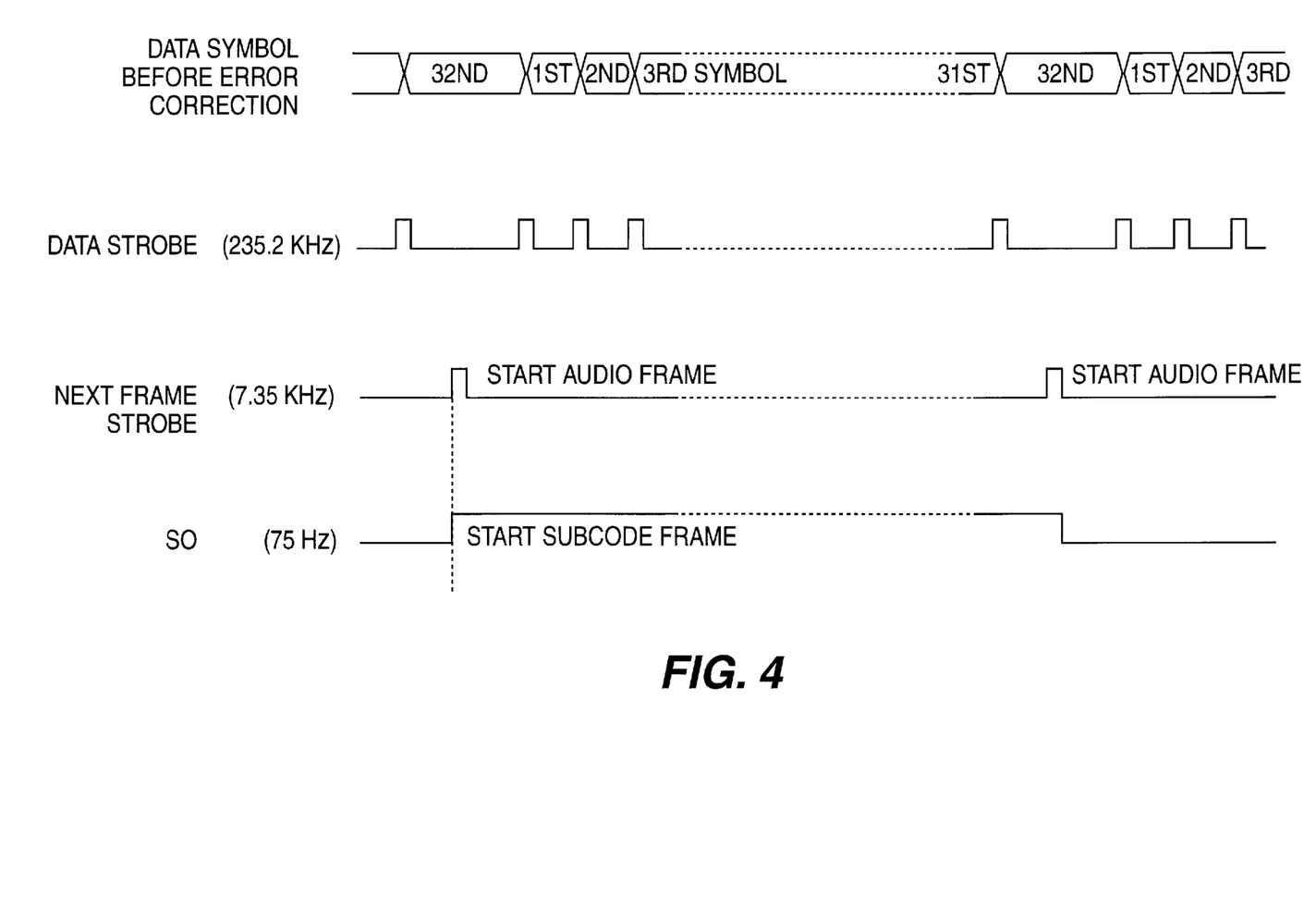
FIG. 4 shows a data diagram of the synchronization.

Both the method and the arrangement of FIG. 1, FIG. 2 and FIG. 4 are correspondingly altered in comparison with the known vibration-resistant playback device. It is an essential aspect of the vibration-resistant playback device having improved synchronization that the synchronization is carried out with little outlay and, nevertheless, with high reliability and absolute accuracy using only spaced-apart data and without the necessity of an interruption of the writing to the buffer 8 or 16. Although the addresses of the data stored in the buffer 8 or 16 for the purpose of data buffering are normally not stored in parallel and, consequently, are not available, nevertheless an item of address information is used for the synchronization. This is possible because a check of the validity of the digital data is fundamentally carried out by means of a so-called CIRC check. The CIRC check is an error correction code developed by Sony, CIRC representing the abbreviation for Cross Interleave Reed Solomon Code. In connection with the CIRC check, the microprocessor 13 also always evaluates the start address of the synchronization byte S0 which is decoded by the subcode decoder 7. Although the addresses of the data in the buffer 8 or 16 are not stored in parallel, an item of address information, which is advantageously used for synchronization in the buffer 8, is thus indirectly available via the synchronization byte S0.

The starting point of this synchronization is formed by a valid subcode, the address information of which can be used as a reference both for the location of the interruption on the information medium 1 and for the last valid data in the buffer 8 and the writing to the buffer 8. Whenever a valid subcode occurs, that is to say whenever the CIRC check has not signalled an error, the microprocessor 13 evaluating the subcode passes the information that the last subcode was valid to the control unit 9. The first address of the subcode, that is to say the address of the synchronization bytes S0, S1, is always stored in the control unit 9. As a result, a location of the data read from the information medium 1 is localized. After the control unit 9 has received the information regarding the presence of a valid subcode, the address is preferably stored in a register R1 of the control unit 9. This stored value then forms the reference when a vibration occurs. When a vibration or a so-called shock occurs, the last valid address in the control unit 9 is thereby stored. Consequently, there are items of information regarding the point on the information medium 1 at which an interruption took place and regarding the address at which writing to the buffer 8 took place and which was still valid. After the interruption due to a shock, the scanning or reading unit is returned to a location on the information medium 1 prior to the interruption. This location may be the last valid location or a location at the point a plurality of subcodes before the interruption. If the scanning device 2 is guided, for example, to a location which was five subcodes before the interruption, then it is known that the shock occurred five subcodes later, the address of which shock is known on account of the storage in the control unit 9. Starting from this address, a calculation is then made back to an address which is located further back, in this example, by five times the number of bytes between the subcodes, with the result that the location in the buffer 8 starting at which the previous buffer contents can be overwritten is localized.

On the other hand, it is possible to move to the subcode at which the shock occurs, and to start with the stored address. The renewed writing always begins at a synchronization byte S0, S1, even if, subsequently, other valid data should still be present. This synchronization to an absolute address ensures absolutely reliable synchronization, as a result of which a chronological offset is in principle precluded.

Using the address which identifies the location of an interruption on the information medium 1 and in the buffer 8, it is also possible for the synchronization and the writing to the buffer 8 following an interruption to be carried out even before the address of the interruption, since the spacing between the address read anew and the stored address of the interruption can be calculated. The data following the address are then overwritten, thus reducing the time to synchronization.

In order to realize the method or this type of synchronization in connection with a buffer 16 arranged downstream of the error correction unit 10 in accordance with FIG. 3, it will be necessary to know the temporal spacing between the synchronization bytes S0, S1 and the subcode.

The synchronization using a buffer 8 arranged upstream of the error correction unit 10 in accordance with FIG. 1 is explained in more detail below.

This method is realized using a circuit arrangement, indicated as a block diagram in FIG. 2, of the control unit 9 which is illustrated in FIG. 1 and is connected to the buffer 8 and the microprocessor 13. The circuit arrangement according to FIG. 2 essentially comprises a first counter Z1, a second counter Z2 and a register R1. As already mentioned, the synchronization byte S0, in particular the rising edge of the synchronization byte S0, is used for the purpose of synchronization, which rising edge is fed to the clock input CLK of the D flip-flop D1. The D input of the D flip-flop D1 is connected to a constant voltage corresponding to a data symbol 1, and the clear input CL is connected to a connection of the microprocessor 13, which is designated below by MPU. It is not only the contents of the D flip-flop D1 which are erased via the clear input CL, but rather the signal from the microprocessor MPU is used to start and stop, via the clear input CL, a write pointer which is specified in even more detail below and is used to stop and start the writing to the buffer 8. The output $\overline{Q}$ of the D flip-flop D1 is connected to an input of an OR gate G1, to the other input of which a data strobe Data Strobe is fed. A strobe Data Strobe is assigned to each synchronization byte S0 which is present in parallel. As is illustrated by the rising edge, indicated by means of a broader line in FIG. 2, of the pulse shape of the synchronization byte S0 and of the data strobe Data Strobe, the rising edge forms the critical part of the signal which is fed from the output of the gate G1 to the clock input Clock of a first counter Z1. The output signal of the OR gate G1 forms the counting clock pulse for the connected first counter Z1. The clocking or counting of the counter Z1 is made possible by a positive S0 edge and enable from the MPU at the D flip-flop D1 as follows. The positive S0 edge sets the $\overline{Q}$ to zero if at the same time the clear input CL is set to enable. As a result of the positive edges of the data strobe, which occur 32 times in an audio frame and at the second input of the OR gate G1, positive clock edges Clock are generated at the output of the OR gate GI or that is to say at the clock input Clock of the first counter Z1.

If the clear input CL of the D flip-flop D1 is set to disable, a constant one level appears at the output $\overline{Q}$. As a result of this, the data strobe edges do not generate a clock pulse Clock at the output of the OR gate G1, since the constant 1 at the output $\overline{Q}$ means that the output signal of the OR gate G1 is likewise constantly 1.

If the clear input CL of the D flip-flop D1 is set once more to enable, then the output $\overline{Q}$ of the D flip-flop D1 is set to zero once more by the next positive S0 edge and, consequently, the counting is restarted by the following data strobe. This first counter Z1 is preferably a 5-bit counter. This is a result of the special design for a CD player, since an audio frame or the frame of the audio signal has 32 bytes, that is to say 5 bits are necessary to identify 32 states. The carry, designated as Carry, of the 5-bit counter Z1 is then used to obtain the clock pulse for the audio frames. The first counter Z1 consequently provides the clock pulse for each byte in the audio frame, which clock pulse is fed to the clock input Clock of a second counter Z2. The second counter Z2 is preferably a 15-bit counter, to which a clock pulse from the carry Carry is fed every 32 bits. Consequently, the second counter Z2 counts the audio frames or frames which are stored. This 15-bit counter Z2 is connected to a register R1 which is used as an address register and permits a preset Preset of the second counter Z2. The preset Preset of the start address of the 15-bit counter Z2 is loaded into the second counter Z2 directly via the data bus of the microprocessor MPU and by MPU Load. The register R1 is used for reading out the last S0 buffer address. The preset Preset forms the smallest unit which can be used to start the write operation to the buffer. Therefore, the start is always made possible with an audio frame as the smallest unit. A total of 98 audio frames then form a subcode. A synchronization byte S0 is used as the starting point for synchronization. The synchronization takes place in such a way that the second counter Z2 is preset with an address for the purpose of synchronization with the next synchronization byte S0, S1, and then, when the synchronization byte S0 occurs, a clock pulse is shifted through to the second counter Z2, which then resumes the writing to the buffer at the address loaded in from the microprocessor MPU. The spacing between two synchronization bytes S0 corresponds to the subcode, with the result that synchronization at 75 Hz or at a spacing of ⅟₇₅th of a second or 13.3 milliseconds is made possible. This spacing is necessary because an evaluation is carried out in this spacing by the microprocessor MPU as to whether the audio data in between are to be regarded as valid or invalid and only this address is available. However, in this case 13.3 milliseconds is to be regarded as a very short synchronization time, since it is not only to be regarded as the time which possibly applies in connection with a data comparison, but rather, on account of the addressing, forms an absolute guarantee for successful synchronization. For the sake of completeness, FIG. 2 also indicates an AND gate G2, which permits resetting initiated compulsorily by the microprocessor MPU and synchronized with the next audio frame. The counters Z1, Z2 are initially set to zero as a result of an error or in the case of a complete restart. For this purpose, the input, designated as Reset from MPU, of the gate G2 is set to 1 and the first counter Z1 and the second counter Z2 are then set to zero, via their respective reset inputs Reset, by the next frame strobe at the Next Frame Strobe input of the gate G2. As a result, the write address is set to 00 until the input, designated as Reset from MPU, of the gate G2 is once more set to 0. Starting takes place with the setting to zero of the input designated as Reset from MPU. In the case of a complete restart, the second counter Z2 is set to 00, via its preset input Preset, in addition to the reset. The buffer is then full beginning at the address 00. In the event of a shock, a disable signal from the MPU is provided at the clear input CL of the D flip-flop D1, as a result of which the write pointer is stopped. A new address value is then loaded into the second counter Z2 via the input Load and Preset, and an Enable from the MPU is finally applied again to the clear input CL of the D flip-flop D1. In this case, the last valid address before the interruption is loaded as the new address value.

For the purpose of explanation, let it be assumed, for example, that the subcode 10 has just been received, to take a random number, and then a shock occurs. As a result of the fact that the valid subcode 10 has been received, the register R1 was read out, which represents the last valid address stored of the synchronization byte S0. As a result, the last valid address of the synchronization byte S0 and the associated subcode 10, that is to say the associated time information on the disk, are known. In this case, the address of the buffer is independent of the absolute time information on the recording medium, which information is stored in the subcode information and is not additionally stored for the purpose of synchronization. After the shock, an attempt is made to jump back in order to return to the same subcode 10 or a subcode before it. In order to orient the scanning device, use is made in a known manner of the subcode information, but this cannot be used directly for orientation in the buffer 8 because there is no correspondence in respect of the addresses. On account of the passage of information through the buffer 8, the subcode address is independent of the address in the buffer. Nevertheless, the intention is for orientation to the subcode to take place for the purpose of synchronization, but use can be made only of the validity of said subcode for determining the relevant address for synchronization in the buffer 8. Using the last valid subcode, the previously read-in address of the buffer 8 is preset again from the register R1 in the second counter Z2 via the preset input Preset, and the clear input of the D flip-flop D1 is set by the MPU enable. This means that with the next synchronization byte S0 it is known where the shock occurred, and with the next synchronization byte starting then takes place again at the address which was written to the second counter Z2 as preset. The output of the second counter Z2 Counter Output provides the write pointer via the bus controller Bus Controller for the buffer Buffer. As a 20-bit memory-writing pointer, the write pointer is composed of the 5 bits of the first counter Z1 and the 15 bits of the second counter Z2. The buffer Buffer is filled or written to by this write pointer. The bus controller Bus Controller then alternately switches the write pointer and the read pointer, which is preferably designed as a 20-bit memory-reading pointer, in order to address the buffer. The actual data are fed for storage to the buffer Buffer via the input Data.

The corresponding data profile is indicated using a data diagram of the synchronization, which is illustrated in FIG. 4. Data symbols before the error correction are illustrated in the top line and occur as a series of 32 successive symbols. They are 24 bytes of audio data and 8 bytes of error correction data. The data strobe for each byte is indicated in the line below, and the next frame strobe, which appears every 32 bytes, for an audio frame is illustrated in the next line. The synchronization byte S0, illustrated in the last line, occurs with a spacing of 1/75th of a second, that is to say with a spacing of 98 audio frames. Consequently, the synchronization byte S0 appears corresponding to once every 98 times 32 bytes.

The length of the synchronization byte S0 is not significant in this case, since, as illustrated in FIG. 2, only the rising edge of the synchronization byte S0 is decisive for the control. Although the above explanations regarding the synchronization were essentially referring to an information medium 1 in the form of a CD, the field of application is not restricted thereby, since in principle all digital latches and information media, including, for example, the digital videodisk or digital tapes, have a comparatively similar data structure which enables the principle described to be applied. Consequently, the application is also possible in connection with magnetic or mechanical scanning devices and also in connection with information media in the form of tape and other two-dimensional information media.

On account of the arrangement of the buffer 8 between the EFM demodulator 4 and the de-interleaving and error correction unit 10 which provides the digital audio information, use can be made of an ARAM, which is less expensive than a DRAM, as the buffer 8. The use of a ARAM or audio RAM, which may be partially defective, as the buffer 8, by which the synchronization following an interruption is also carried out, is made possible by the arrangement upstream of the error correction unit 10. The buffer 8 is arranged, in accordance with the design illustrated in FIG. 1, between a pulse-shaping and EFM demodulator unit 4 and the error correction and de-interleaving unit 10. This arrangement of the buffer 8 advantageously permits the use of address information for the purpose of synchronization. Although the address information contained in subcode information occurs only with large spacings and the reading speed is temporarily changed, said address information can be used on account of the time base compensation function based on the buffer 8.

A further aspect is the rapid availability of data for reproduction after starting the playback device.

If the vibration-resistant playback device presented is started, data from the information medium 1 are available in the buffer 8 or 16 for the purpose of reproduction as early as when the normal speed corresponding to the normal or first reading speed V1 is reached, and the reproduction does not have to be delayed until there has been an acceleration to the doubled reading speed of the known playback device, as a result of which, as a further advantage, a shorter access time is achieved.

We claim:

1. Vibration-resistant playback device having improved synchronization, comprising:
   a buffer for providing information signals from an information medium during an interruption of the reading of information stored on the information medium,
   a pulse shaping and demodulating unit including a bit timing PLL for processing the information read from the information medium at a variable data rate between a first data rate and a second data rate, said first and second data rates being greater than zero, wherein the degree of filling of said buffer is maintained within predetermined limit by continuous reading of information stored on the information medium,
   a subcode decoder for receiving subcode information from said demodulating unit having a data rate according to the data rate received from said demodulating unit divided by the occurrence of subcode information in said information read from the information medium,
   a microprocessor connected to said subcode decoder for evaluating and validating subcode information address data, and
   a control unit connected to said buffer, said subcode decoder, and said microprocessor to store an address of a write pointer of the buffer in the case of a last valid item of subcode information and to start with a synchronization byte following an interruption for synchronization of a data stream in the buffer at said variable data rate.

2. A vibration-resistant playback device according to claim 1 wherein the control unit includes the microprocessor.

3. Vibration-resistant playback device according to claim 1 wherein the control unit is designed to set a reading speed of the information stored on the information medium within a capture range of the bit timing PLL.

4. Vibration-resistant playback device according to claim 1 wherein the control unit is designed as an integrated part of a decoder which is intended to provide an information signal read from the information medium.

5. Vibration-resistant playback device according to claim 1 wherein the buffer is arranged between a first assembly for pulse shaping of the signal read from the information medium and a second assembly for error correction.

6. Vibration-resistant playback device having improved synchronization, comprising a buffer for providing information signals from an information medium during an interruption of a reading of information stored on the information medium, a pulse shaping and demodulating unit including a bit timing PLL for processing the information read from the information medium at a variable data rate between a first and a second data rate, said first and second data rates being greater than zero, wherein the degree of filling of said buffer is maintained within predetermined limits by continuous reading of information stored on the information medium, a subcode decoder for receiving subcode information from said demodulating unit having a data rate according to the data rate received from said demodulating unit divided by the occurrence of subcode information in said information read from the information medium, a microprocessor connected to said subcode decoder for evaluating and validating subcode information address data, and for providing an item of address information which identifies the interruption location of the reading of information stored on the information medium, and a control unit connected to said buffer, said subcode decoder, and said microprocessor to store an address of a write pointer of the buffer in the case of a last valid item of subcode information, and to start with a synchronization at valid subcode, the address information of which is used as a reference both for the location of said interruption on the information medium and for a last valid data in the buffer and to overwrite a corresponding information which already has been stored in the buffer, at said variable data rate.

7. Vibration-resistant playback device according to claim 6, wherein said address information is a write address of the buffer which is transmitted to a register and is used together with a valid subcode and together with a synchronization byte as the starting point for synchronization following said interruption.

8. Vibration-resistant playback device according to claim 6 wherein said address information is a write address of the buffer which is transmitted to a register, for determining an interruption of reading in the buffer, together with said valid subcode, and, the microprocessor calculates an address situated to one or more addresses of the buffer before the interruption, which is used with a synchronization byte as the starting point for synchronization following said interruption.

9. Vibration-resistant playback device according to claim 6, wherein the control unit sets different reading speeds of information stored on the information medium as a function of a first occupancy value and a second occupancy below a storage capacity of the buffer.

10. Vibration-resistant playback device according to claim 6, wherein an address of a synchronization byte of subcode information of the information read from the information medium which corresponds to an information stored in the buffer is used to synchronize data in the buffer following an interruption of writing of data to the buffer caused by said interruption of the reading of information stored on the information medium.

11. A vibration-resistant playback device according to claim 6 wherein the control unit includes the microprocessor.

12. Vibration-resistant playback device having improved synchronization, comprising:

a buffer for providing information signals from the information medium during an interruption of the reading of information stored on an information medium, a pulse shaping and demodulating unit including a bit timing PLL which is provided for processing the information read from the information medium, a subcode decoder for receiving subcode information from said demodulating unit having a data rate according to the data rate received from said demodulating unit divided by the occurrence of subcode information in said information read from the information medium, a microprocessor means coupled to said decoder and said buffer including a microprocessor for evaluating and validating subcode information address data from said subcode decoder and a control unit for storing an address of a write pointer of the buffer in the case of a last valid item of subcode information controlled by said microprocessor and starting with a synchronization byte following an interruption for synchronization of a data stream in the buffer, wherein the control unit has a first counter which is started by an edge of a synchronization byte, is clocked by a data strobe which has a carry output connected to a clock input of a second counter, which can be both reset and preset with a write pointer address provided by a connected register outputs of the first counter and of the second counter being coupled to form a write pointer connection, to which the register is connected.

* * * * *